Feb. 28, 1967     R. V. HARRINGTON     3,306,108
HUMIDITY SENSING ELEMENT
Filed Jan. 11, 1965
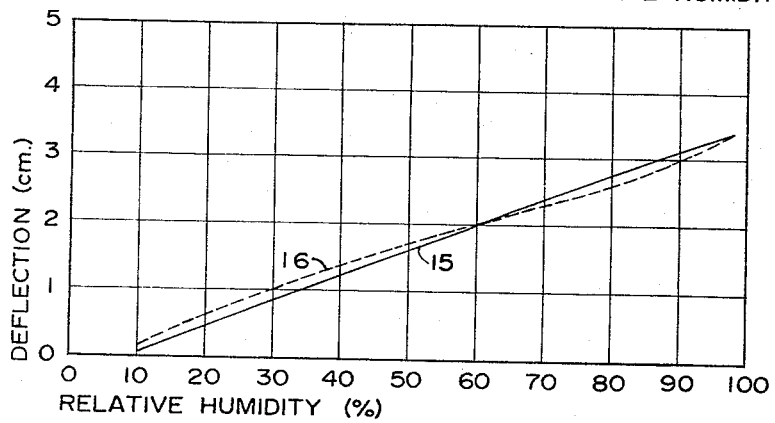
FIG. 1
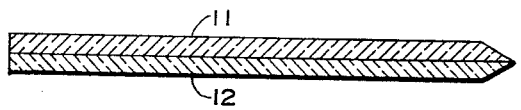
FIG. 2
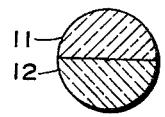
FIG. 3
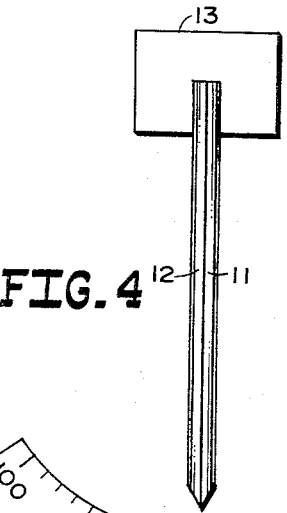
FIG. 4
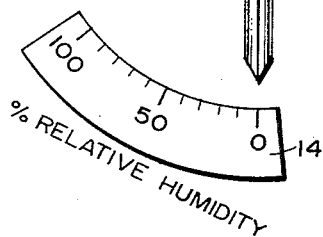
INVENTOR.
Roy V. Harrington
BY *Gerhard K. Adam*
ATTORNEY 3,306,108
HUMIDITY SENSING ELEMENT
Roy V. Harrington, Corning, N.Y., assignor to Corning Glass Works, Corning, N.Y., a corporation of New York
Filed Jan. 11, 1965, Ser. No. 424,497
5 Claims. (Cl. 73—337)

This invention relates to an hygrometric element comprising a bi-laminar glass structure of porous and nonporous glass.

Mechanical hygrometers depend for their operation on the expansion and contraction of certain hygroscopic substances with variation in their moisture content. This moisture content changes as the humidity of surrounding air varies. The materials commonly used are wood, paper, silk, animal membranes and hair. Most commonly these mechanical hygrometers are so arranged that the expansion and contraction of the material causes a pointer to move over a dial which may be calibrated to read directly in relative humidity. A common type of mechanical adsorption hygrometer is the hair hygrometer. This instrument commonly employs human hair which has been treated to remove the oil, as the humidity sensing element. Such devices employ one or more hairs fixed to a stationary base at one end and fixed to a movable pointer at the other end, the pointer being directed to a dial which may read directly in relative humidity.

Another type of mechanical hygrometer is the spiral coil hygrometer. It is similar in appearance and principle to a bimetallic thermometer. It is generally composed of a strip of wood shaving or other hygroscopic material cemented to a thin metal strip or screen having the desired spring characteristics. Changes in dimensions of the hygroscopic material cause the coil to unwind for higher humidity or wind for lower humidity.

Mechanical adsorption hygrometers of the types described have been in common use for many years. However, they have generally proven unsatisfactory for accurate measurements over an extended period of time. The contraction and extension of the hygroscopic substance during repeated cycles of humidity result in a loss of elasticity and changes in calibration.

It is an object of the present invention to provide hygrometric element for the accurate measurement of humidity, which is resistant to deterioration over extended periods of use in repeated cycling of humidity.

The above and other objects are attained in accordance with the present invention which comprises a bi-laminar glass structure of porous and nonporous glass. In operation the bi-laminar structure will exhibit movement in the form of a flexing action as a function of humidity change. The flexing action results from the expansion and contraction of the porous glass lamina due to the adsorption and desorption of water vapor. The nonporous glass is substantially inert to the effects of water vapor and exhibits no noticeable change of physical dimensions resulting from the presence of water vapor.

The preparation of porous glass is an intermediate step in the production of the high silica glass commonly referred to as 96% silica glass. It is made by acid leaching of a phase-separated alkali borosilicate glass. The acid leaching step removes a soluble phase from the glass and leaves a high silica glass having a multitude of intercommunicating microscopic pores throughout. The porous glass may be consolidated by further heat treatment, to a nonporous high silica glass. The glass, either in the porous or nonporous state, has become known in the trade by the generic name "96% silica glass." One commercial form of porous glass (Corning Code 7930) has been shown to have an internal surface area of approximately 250 square meters per gram, and a pore diameter of approximately 40 angstroms. Water vapor is readily adsorbed on the pore surfaces and the result is an expansion in volume of the porous glass. The preparation of porous glass is disclosed in U.S. Patent No. 2,106,744 to Hood and Nordberg.

The problem of aging associated with conventional mechanical hygrometers is overcome in the hygrometric elements of the present invention. The elastic properties of glass at ordinary temperatures are such that the bi-laminar glass structure of the present invention may be subjected to extended periods of humidity cycling with no noticeable change in calibration.

A better understanding of the present invention is obtained by reference to the accompanying drawings wherein:

FIG. 1 is a graph showing the displacement of the free end of a 13 cm. long flexing bi-laminar element as a function of relative humidity.

FIG. 2 is a longitudinal sectional view of a bi-laminar hygrometric element in accordance with the present invention.

FIG. 3 is a transverse sectional view of a bi-laminar fiber element in accordance with the present invention.

FIG. 4 depicts the element of FIG. 1 wherein the element has been incorporated in a typical humidity measuring device.

In FIG. 2, a layer of porous glass 11 is joined to a layer of nonporous glass 12 to form an hygrometric element. On exposure to moisture the element will bend so that the porous glass layer will form the convex surface and the nonporous layer will form the concave surface. The bending action results from the expansion of the porous glass due to the adsorption of water vapor in the pores. The bi-laminar element may be in the form of a compound fiber such as that shown in transverse section in FIG. 3.

As shown in FIG. 4, the element may be readily incorporated in a humidity measuring device, by attaching one end of the element to a stationary base 13 and providing a scale 14 to indicate the degree of bending. The scale may be conveniently calibrated to read directly in percent relative humidity.

The graph of FIG. 1 shows the response curve of a hygrometric element prepared in accordance with Example I below and mounted in a device similar to that shown in FIG. 2. In the graph, the amount of bending of the element as measured by the displacement of the free end in centimeters, due to adsorption of moisture at various relative humidities, is shown by the adsorption curve 15. Minor hysteresis effects result in a slight displacement of the desorption curve 16.

The bi-laminar elements of the present invention, may be prepared in the form of a sheet, bar, fiber or other relatively thin compound structures. For greatest sensitivity, as well as ease of construction, I have found it preferable to prepare the elements in the form of a bi-laminar fiber. Compound fibers may be employed having diameters at least as great as 25 mils or greater. However, in general the larger the diameter the less flexible the fiber will be. Fibers having a diameter of less than 6 mils are extremely fragile, although they may be used. I prefer to employ fibers having a diameter between about 10 and 25 mils.

By way of further illustration of the present invention and the manner in which it may be practiced, the following specific examples are offered:

*Example 1*

Two glass rods, 8 mm. diameter each, having the following approximate compositions:

(1)

| | Percent |
|---|---|
| $SiO_2$ | 80.0 |
| $B_2O_3$ | 12.2 |
| $Al_2O_3$ | 2.6 |
| $Na_2O$ | 4.0 |
| $CaO$ | 0.8 |
| $K_2O$ | 0.4 |

(2)

| | |
|---|---|
| $SiO_2$ | 63.0 |
| $Na_2O$ | 6.6 |
| $Al_2O_3$ | 3.5 |
| $B_2O_3$ | 27.0 | were heated in a flame and fused lengthwise. The compound rod was drawn to a fiber having a 12 mil overall diameter. Glass No. 1 is a commercially available heat-resistant borosilicate glass. Glass No. 2 is a specially selected phase-separable glass of type described in the aforementioned Hood et al. Patent No. 2,106,744, which, on proper heat treatment and leaching as hereinbelow described, will yield a porous glass structure having a composition of approximatly 96% silica.

The compound fiber was heated to about 550°–600°, held for several hours and cooled to room temperature to cause a phase separation in glass No. 2. The glass was then leached for several hours with 3.0 N $HNO_3$ at 90° C. to remove the soluble portion and then washed first with dilute $HNO_3$ and tehn with deionized water.

The foregoing treatment resulted in the conversion of glass No. 2 to a high silica glass having a multiplicity of intercommunicating pores. Glass No. 1 was substantially inert to the treatment.

The compound fiber was then cut to 13 cm. in length and mounted vertically in a manner similar to that shown in FIG. 2, the upper end being fastened to a stationary base with the aid of an epoxy cement. The fiber was then placed in a controlled humidity cabinet and subjected to various humidities at room temperature. The deflection, in centimeters, of the free end of the fibers was noted at various relative humidity conditions. The data obtained is shown graphically in FIG. 1.

*Example 2*

A compound fiber 9.8 centimeters in length was prepared, mounted, and tested as described in Example 1. The deflection observed as a function of relative humidity was as follows:

| Percent R.H. | Deflection (centimeters) | |
|---|---|---|
| | Adsorption | Desorption |
| 5 | 0 | 0.1 |
| 8 | 0.8 | 0.8 |
| 30 | 1.9 | 2.1 |
| 70 | 2.7 | 2.9 |
| 98 | 4.5 | 4.5 |

It will be apparent to those skilled in the art that many variations and modifications of the invention as hereinabove set forth may be made without departing from the spirit and scope of the invention. The invention is not limited to those details and applications described, except as set forth in the appended claims.

I claim:
1. An hygrometric element comprising a bi-laminar glass structure wherein one lamina is of porous and the other of non-porous glass.
2. An element according to claim 1 wherein said bi-laminar structure is a compound fiber.
3. An element according to claim 1 wherein said porous glass is 96% silica glass.
4. A humidity measuring instrument containing, as the active humidity-sensing element, a bi-laminar glass structure wherein one lamina is of porous glass and the other of non-porous glass.
5. A humidity measuring instrument according to claim 4 wherein said element is a compound fiber and said porous glass is 96% silica glass.

References Cited by the Examiner
UNITED STATES PATENTS 2,051,246 8/1936 Goss _____ 73—337
2,573,685 11/1951 Blinn et al. _____ 73—337

LOUIS R. PRINCE, *Primary Examiner.*

J. NOLTON, *Assistant Examiner.*